(No Model.) 7 Sheets—Sheet 2.

O. MERGENTHALER.
LINOTYPE MACHINE.

No. 565,488. Patented Aug. 11, 1896.

Witnesses
Raymond T. Barnes.
Fabius A. Elmore.

Inventor
Ottmar Mergenthaler
By Philip T. Dodge
Attorney

THE NORRIS PETERS CO., PHOTO-LITHO., WASHINGTON, D. C.

(No Model.)

O. MERGENTHALER.
LINOTYPE MACHINE.

No. 565,488.

Patented Aug. 11, 1896.

Fig. 5.
on line 5—5.

Witnesses
Raymond T. Barnes.
Fabius L. Elmore.

Inventor
Ottmar Mergenthaler
By Philo S. Dodge
Attorney (No Model.) 7 Sheets—Sheet 4.
O. MERGENTHALER.
LINOTYPE MACHINE.
No. 565,488. Patented Aug. 11, 1896.

Witnesses
Raymond F. Barnes.
Fabris S. Elmor.

Inventor
Ottmar Mergenthaler
By Phil T. Dodge
Attorney (No Model.) 7 Sheets—Sheet 5.
O. MERGENTHALER.
LINOTYPE MACHINE.

No. 565,488. Patented Aug. 11, 1896.

(No Model.)  7 Sheets—Sheet 6.

O. MERGENTHALER.
LINOTYPE MACHINE.

No. 565,488. Patented Aug. 11, 1896.

Witnesses
Raymond S. Barnes.
Fabius S. Elmore.

Inventor
Ottmar Mergenthaler
By Phil. T. Dodge
Attorney (No Model.) 7 Sheets—Sheet 7.

O. MERGENTHALER.
LINOTYPE MACHINE.

No. 565,488. Patented Aug. 11, 1896.

Witnesses
Raymond P. Barnes.
Fabius S. Elmore.

Inventor
Ottmar Mergenthaler
By Phil T. Dodge
Attorney

UNITED STATES PATENT OFFICE.

OTTMAR MERGENTHALER, OF BALTIMORE, MARYLAND, ASSIGNOR TO THE MERGENTHALER LINOTYPE COMPANY, OF NEW YORK, N. Y.

LINOTYPE-MACHINE.

SPECIFICATION forming part of Letters Patent No. 565,488, dated August 11, 1896.

Application filed July 29, 1893. Serial No. 481,854. (No model.)

*To all whom it may concern:*

Be it known that I, OTTMAR MERGENTHALER, of Baltimore, in the State of Maryland, have invented a new and useful Improvement in Linotype-Machines, of which the following is a specification.

This invention relates to means for automatically spacing out or justifying composed lines of type-matrices or type-dies to a predetermined and uniform length. In the composition of these lines it is impossible to calculate in the course of composition the space which will remain to be filled out after the last word or syllable possible has been introduced into the line, and it is therefore necessary that the mechanism employed shall provide for the introduction of wider or narrower spaces into the line under all possible combinations which may be encountered in practice. To this end I employ for spacing purposes a series of bars or fingers each increasing in thickness step by step from one end toward the other, so that by thrusting them endwise through the line they may be caused to present a greater or less thickness in the line, as occasion may demand. As the spaces are and must be advanced definite distances through the line at each adjustment, the length of at least one step, it will follow that if all the spaces are advanced simultaneously they will add to the line a length equivalent to the sum of the steps which are introduced. Now in practice it frequently happens that the space remaining to be filled is less than that represented by the sum of the steps, one on each space. It is therefore necessary, in order to permit the filling out of a small space at the close of the justification, to provide for the advance of one or more of the spaces beyond the others.

The mechanism shown in the accompanying drawings is adapted to meet all of the requirements named.

I have represented my invention as incorporated in a machine for justifying lines of matrices previously composed in a galley, and for casting from the lines when justified, linotypes or line-printing bars, after the well-known Mergenthaler system now in general use. With the exception of the justifying devices the present machine is foreign to the invention here claimed, being made the subject-matter of a separate application, filed on the 6th day of July, 1893, Serial No. 479,752.

While I have represented the spaces herein as fixtures in the machine, so that the same series of spaces act on all lines presented to them, it is to be understood that the invention extends to and includes any other arrangement of the stepped spaces and mechanisms for operating them with the same effect as the devices herein described.

In order that the action of the justifying devices may be clearly understood, I will first describe the general organization of the machine.

Referring to the drawings, A represents a main frame which may be of any construction adapted to sustain the other parts of the machine hereinafter described.

B is a horizontal driving-shaft mounted in bearings in the main frame and provided at one end with driving-pulleys C C', and at different points in its length with the various cams for imparting motion to the active parts of the machine, as hereinafter described in detail.

D and D' are two galleys provided each with a series of parallel transverse grooves or channels, each channel intended to receive a composed line of matrices E, bearing in proper order the characters to appear in one line of print.

The two galleys D and D' are arranged to slide in parallel lines and in opposite directions along suitable guides on the main frame, so that the successive lines may be transferred from the galley D to an intermediate casting mechanism and thence to the galley D'. Each of the matrices is made of the form shown in Fig. 12, and consists of a thin metal plate having a matrix or character proper, $e$, in its recessed lower end, and a series of external teeth $e'$ for distributing purposes on the upper end. Between the two galleys is arranged a horizontal guide G, intended to receive a line of matrices and hold it in position over an underlying mold during the operation of casting a slug or linotype. The guide G is attached to and sustained by one end of a rising and falling table I, Fig. 5, mounted on a horizontal axis $i$ and presenting one end against the side of the matrix-line. A corresponding table I', mounted in like manner, presents one of its ends against the opposite side of the matrix-line, this second table being connected with the guide G by link $i'$, so that when the line of matrices is pushed endwise from the galley into the guide G it will be embraced and held in alinement between the ends of the two tables, by which it may be carried down and presented to the underlying mold $m$. There are four of these slotted molds, each having the internal dimensions of a linotype, mounted in a horizontal hollow cylinder or carrier M, the rotation of which serves to present the four molds in succession beneath the matrix-line in the manner represented in Figs. 3, 2, and 5.

Figure 1:
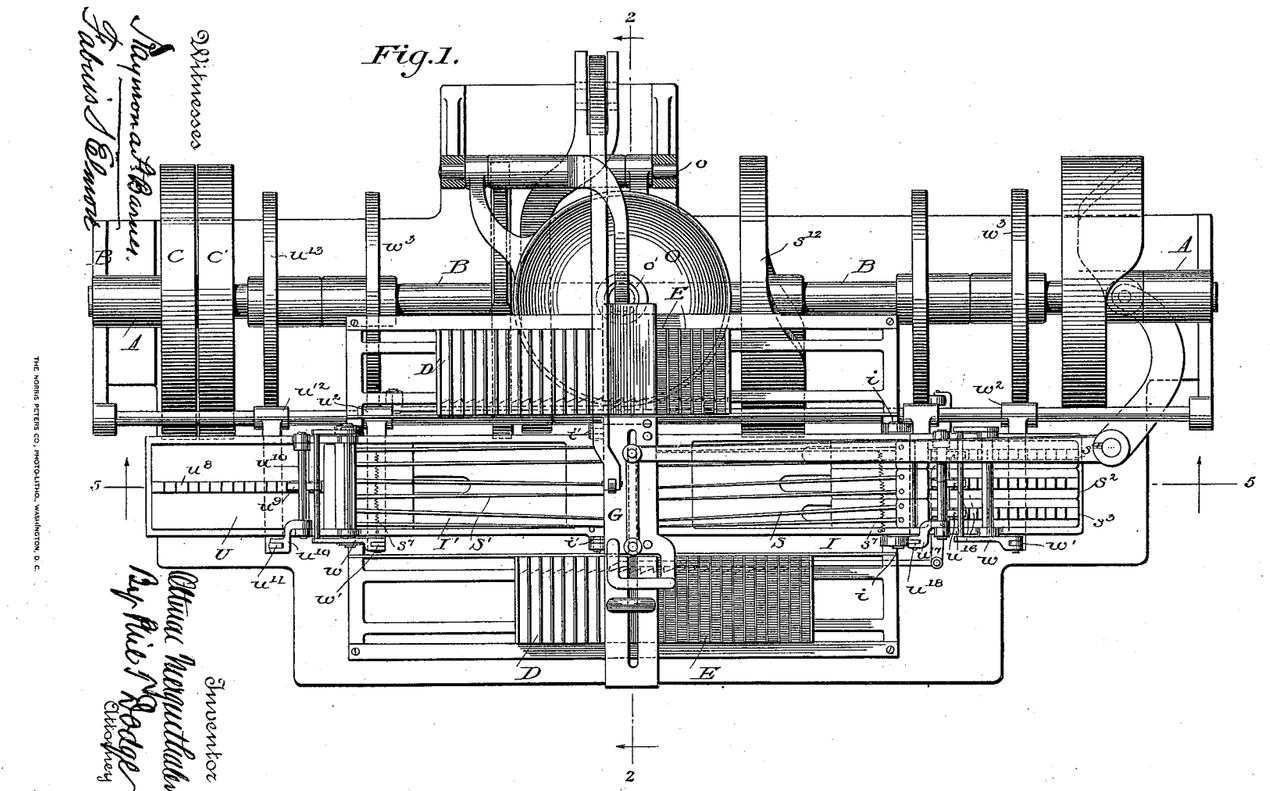
Figure 1 is a top plan view of my casting and justifying machine.
Figures 1, 2, 3, 4:
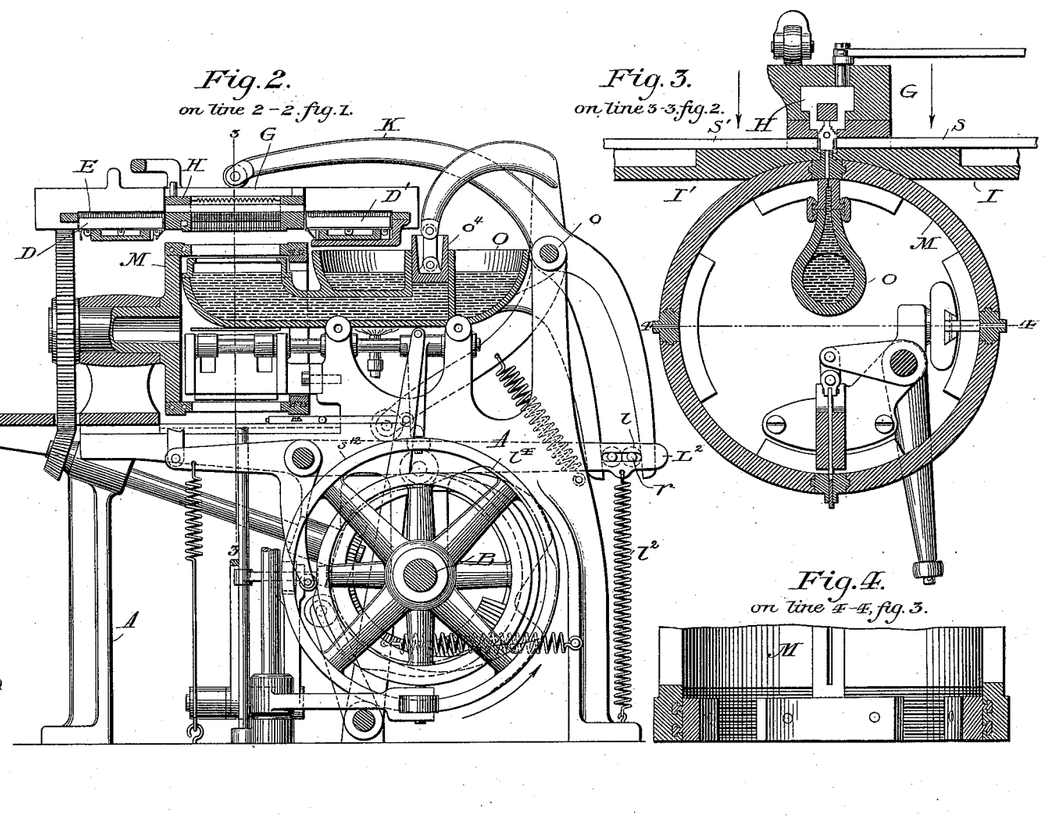
Fig. 2, a vertical cross-section on the line 2 2 of Fig. 1.
Fig. 3, a vertical cross-section through the casting mechanism, the parts in operative position on the line 3 3 of Fig. 2.
Fig. 4 is a horizontal section through one end of the mold on the line 4 4 of Fig. 3.

A melting-pot O, heated by a gas-flame thereunder and sustained by a horizontal pivot $o$, is provided with a projecting spout or delivery-mouth, extending within the mold-carrying cylinder and suitably formed and arranged to close against the lower side of that mold which is for the time being beneath the line of matrices, as plainly shown in Fig. 2. This melting-pot is provided with a pump-plunger $o^4$, which serves to deliver the molten metal through the mouth of the pot into the mold in the form of a slug or linotype against the overlying matrices, which produce their characters in relief on its edge after the manner practiced in the ordinary Mergenthaler linotype-machines. The transfer of the matrix-line from the first galley into the guide G preparatory to the casting action and from the guide G to the second galley after the casting action is effected by a transversely-reciprocating carriage H, traveling on the guide G and having two jaws between which the matrices are embraced during their transfer. After the line is transferred to the guide G the latter descends, together with the ends of the table, from the receiving position (shown in Figs. 2 and 5) to the casting position, (shown in Fig. 3,) carrying the matrices down and causing their lower notched ends to fit closely over the protruding mouth of the mold. This depression of the guide G is effected by a lever K, pivoted to the main frame and having at one end a roller which bears upon the guide, while at the opposite and lower end it is acted upon by a roller $r$ in one end of a vertically-swinging lever $L^2$, which is depressed by a spring $l^2$ and elevated by a cam $l^4$, mounted on the main shaft and acting against a lug or roller on the lever. When the guide is relieved from the pressure of the arm K, it rises under the influence of springs $i^2$, Fig. 5, which pull the outer ends of the table downward, causing their inner ends to rise.

The various devices for rotating the mold and trimming and ejecting the linotypes are wholly foreign to the present improvement, and being described in the application filed July 6, 1893, above named, need not be further described herein.

Figures 6, 7:
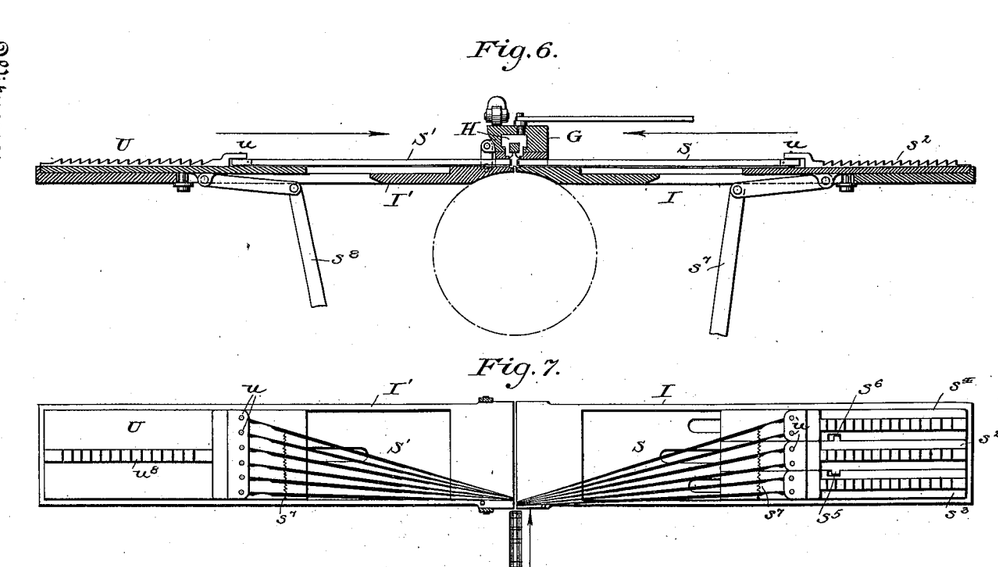
Fig. 6 is a similar section through the justifying devices with the parts in position for casting.
Fig. 7 is a plan view showing the initial positions of the justifying devices previous to the introduction of the composed line between them.

Passing now to the justifying devices, attention is called more particularly to Figs. 6 to 16. The spaces or justifying devices proper consist of the two series of space-bars S S', hereinafter designated as "spaces." Each space consists of a long blade or bar having its thickness increased step by step from one end toward the other, so that it presents at different points in the length portions or sections of different thickness, each section having its opposite faces parallel or practically so. Each section is connected with the next by an inclined step or shoulder, this rise of the surface from one section to the next by gradual ascent serving to admit of the bars being the more readily thrust into or through the line of matrices. The spaces may all be alike in length and thickness. They are divided into two groups, arranged, respectively, above the tables I and I' with their inner or thinner ends presented toward the place which the matrix-line occupies during the casting operation. The forward ends of the spaces are thin and flexible, and near the rear ends they are also reduced in thickness, as shown particularly in Figs. 7 and 8, to render them flexible at that point. This construction admits of the forward ends of the spaces adapting themselves to the positions which they may occupy in the line and of their sliding squarely into the line between the matrices, although their rear ends may stand either to the right or left of the point of entrance. Each space is mounted at its outer end on a vertical pivot $u$, so that its inner end may swing laterally or, in other words, horizontally along the side of the matrix-line, so as to enter the line at any required point. The outer or forward ends of the spaces are flexible or elastic to a limited extent, so that they may be thrust squarely through the line, although their outer or rear ends are out of line with, that is to say, to one side of, the active portion between the matrices. Springs $s^7$ serve to draw the ends of all the spaces together in a compact group at one side of the table previous to the introduction of the matrix-line endwise between them to the casting position, as shown in Fig. 7. The spaces in the group S' on the left side of the machine are all connected to one slide U, arranged to move in guides on the table to and from the matrix-line, so that when the slide is advanced it will serve to thrust all of the spaces through the line at the points where their ends chance to stand.

The spaces on the right side of the machine, in the present instance six in number, are divided into pairs and connected, respectively, to slides $s^2$, $s^3$, and $s^4$, by means of which these bars may be also advanced through the line, like those on the left. The three slides on the right are allowed, however, a limited independent motion, so that each pair of slides may be advanced into the line slightly in advance of the next, and this in order that the space remaining to be filled may be filled by two spaces advancing beyond the others and presenting in the line slightly thicker spaces than the others, if they are alone sufficient to fill the line to the required length. In other words, this independent motion admits of the increased thickness of two steps only being thrown into the line at a time whenever the vacant space is insufficient to admit additional steps on a larger number of spaces. The independent motion may be effected in any suitable manner. In the present instance the slide $s^2$, at the middle, is provided with studs $s^5$ and $s^6$, projecting into notches in the adjacent slides, the notches and studs being so shaped and located that the slide $s^2$, after advancing independently, first starts the slide $s^3$ and thereafter the slide $s^4$.

Figure 5:
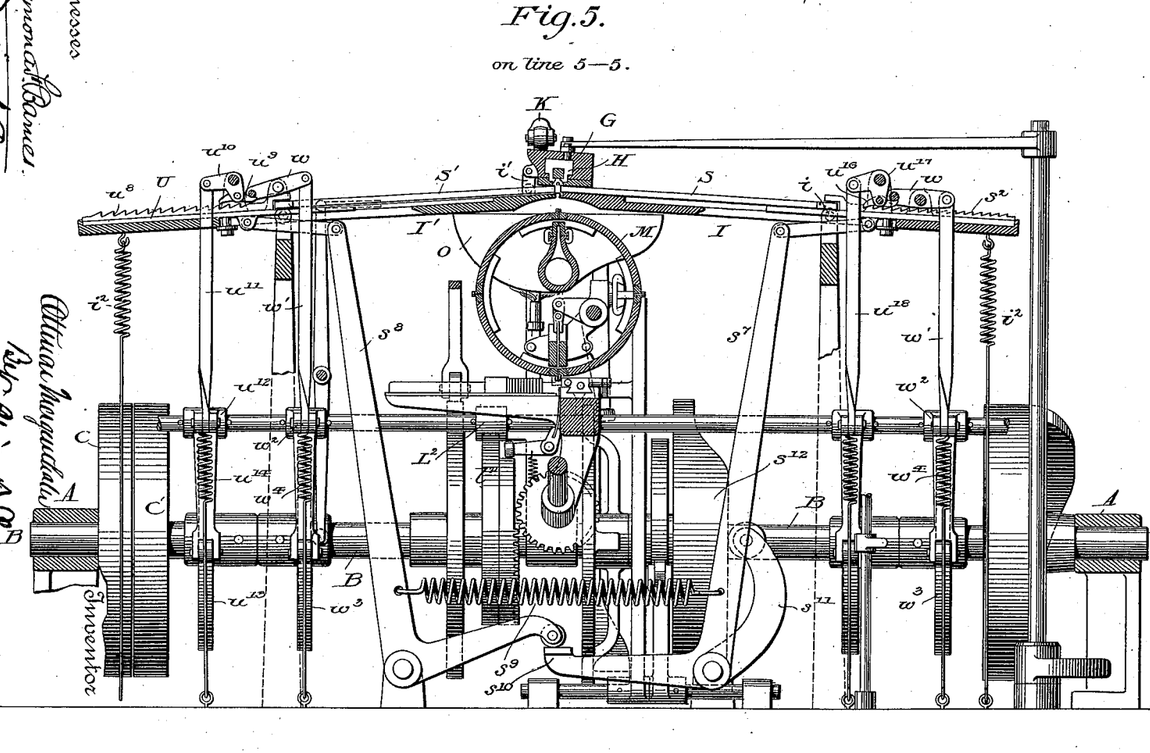
Fig. 5 is a longitudinal vertical section through the machine on the line 5 5, Fig. 1.
Figure 17:
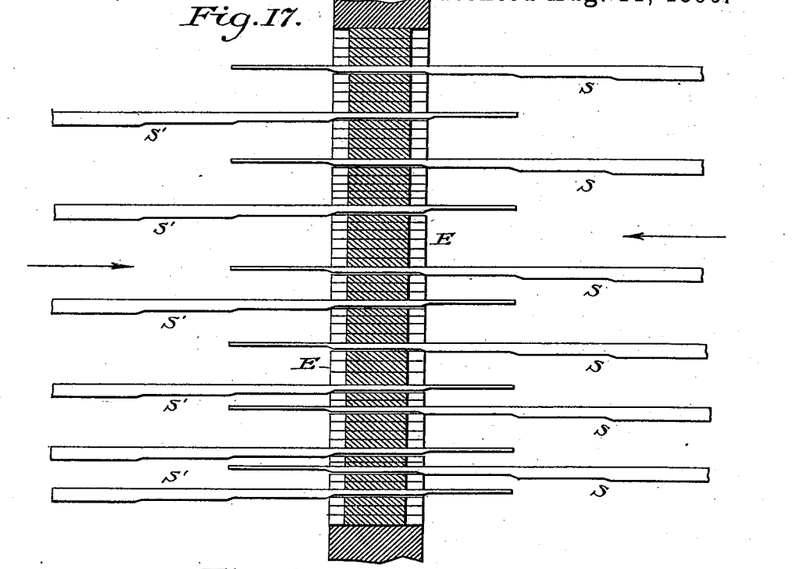
Figs. 17 and 18 are plan views showing in horizontal section a composed line of matrices with the spaces in the different positions assumed during the course of justification.

The advance of the slides in order to thrust the spaces through the line from opposite sides is effected by connecting slide $u$ (see Figs. 5 and 6) with a lever $s^8$ and slide $s^2$ with a lever $s^7$, these two levers being connected in turn by an intermediate spring $s^9$, Fig. 5, which draws them together. The retraction of the slides to restore the spaces to their original position is effected by providing the shaft of lever $s^7$ with arms $s^{11}$, acting on a cam $s^{12}$ on the main shaft, and by arranging the lower end of lever $s^7$ to act against the lower end of lever $s^8$, as shown in Fig. 5. When the parts are relieved from the lifting action of the cam, the two series of spaces will be thrust through the line (assuming their ends to have been first distributed along the line) until they spread it out, as shown in Fig. 17, to the maximum length permitted by the jaws or abutments of the carrier H, as shown in Fig. 2. As soon as the line is expanded against the abutments or confining devices, which limit its length, the advance of the spaces is arrested by their thicker shoulders coming in contact with the matrices, between which there is insufficient space to admit them. This action is clearly illustrated in Fig. 17, in which it will be seen that certain of the bars or spaces have their inclined shoulders partly entered into the line. To complete the justification, it is necessary that certain of the spaces shall be slightly withdrawn, in order to give in the line additional space to permit the full entrance of the partly-entered shoulders of the remaining spaces. I effect, therefore, the retraction of the spaces S' on the left of the machine by providing their slide U with ratchet-teeth $u^8$, engaged by a dog $u^9$, carried by elbow-lever $u^{10}$, which is in turn actuated by rod $u^{11}$, connected with the lever $u^{12}$, which is depressed by a spring $u^{14}$, and elevated at the proper time by cam $u^{13}$ on the main shaft. Immediately after the bars have all been thrust forward the above parts operate to retract the spaces S' just sufficiently to back their partly-entered shoulders out of the matrix-line. The additional space thus afforded will permit the further advance of the partly-entered shoulders of the spaces S from the opposite side.

Figure 18:
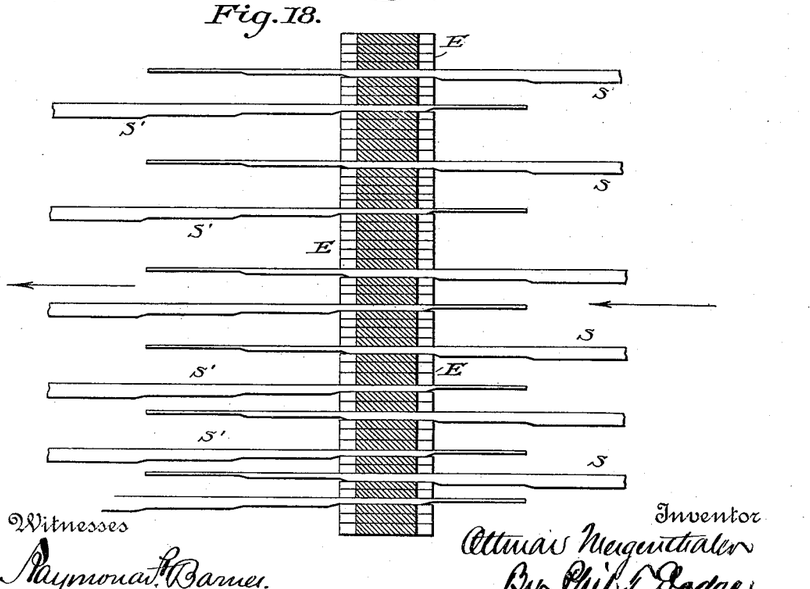

In order that the entered section of the spaces S may be thrust fully into the line, so as to lie with parallel faces between the matrices and cover the mold between the matrices to prevent a leakage of metal, I provide the slides on the right with ratchet-teeth $s^2$, facing in the opposite direction from those on the left of the machine and engaged by dogs $u^{16}$, operated by lever $u^{17}$, and cam and spring connections similar to those at the other side of the machine. The ratchet-teeth of the right-hand slides correspond in length to the steps of the spaces, and the dogs act to advance the slide and spaces until the latter have their operative sections fully seated in the line, as shown in Fig. 18. The forward movement of the dogs and slides is such that the spaces are advanced thereby the distance of one step only, or less. In other words, the action is to carry home into the line only that step which is already selected or entered. It will be noticed that the withdrawal of the partly-entered shoulders of the one set of spaces leaves sufficient room in the line for the admission of the operative steps of the remaining spaces. The several pairs of slides on the right may or may not have their spaces entered into the line to the same extent. If they do not, there will be a slight variation in the width of the spaces in the line, as there may be also a slight variation between the width presented by the spaces from the left and those on the right; but this variation will be, in any event, so slight as to be inappreciable to the eye and therefore unobjectionable. The slides entered from the right will always have those steps which may happen to be entered in the line fully entered. The slide on the left has its ratchet-teeth of such length and in such relation to the steps on its slides and to the movement of the retracting dogs or pawls that when the slides are withdrawn to the left their shoulders will stand just outside of the matrix-line.

Figures 12, 13:
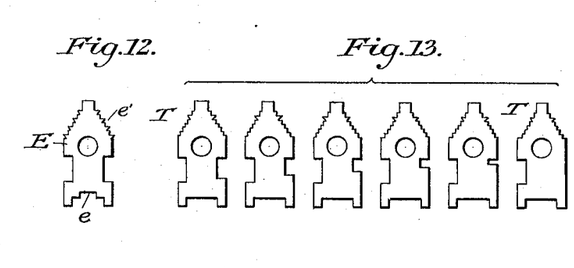
Fig. 12 is a side view of one of the character or letter matrices.
Figs. 13 and 14 are side views showing the various forms of the selecting-plates by which the spaces are distributed or adjusted at their ends in positions to enter the line at the required points.
Figure 14:
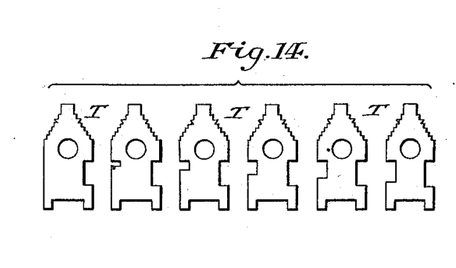
Figure 15:
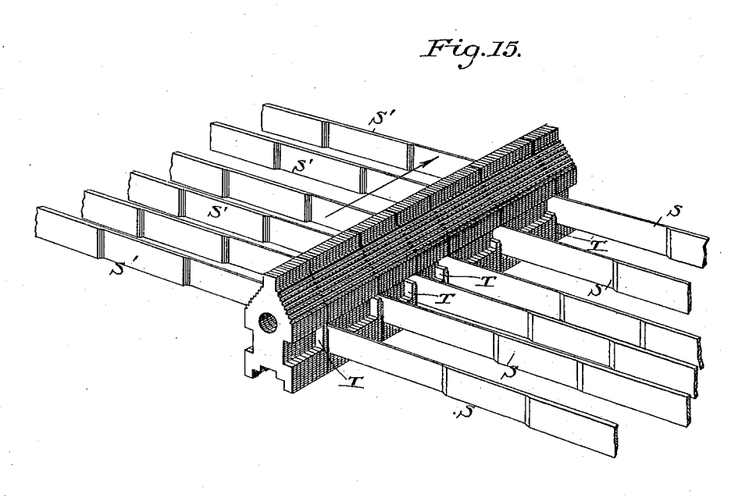
Fig. 15 is a perspective view showing a line of matrices with the ends of the spaces adjusted in the proper positions to enter the same for the purpose of effecting the justification.
Figure 16:
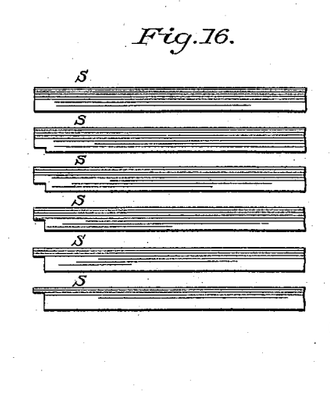
Fig. 16 is a view showing the variant forms of the ends of the spaces in one set or series by which they are adapted to coöperate each with a particular selecting-plate.

In order to provide for the automatic distribution of the ends of the spaces along the sides of the successive matrix-lines, that they may enter at the proper points, I provide and set into the lines during their composition a series of selecting-plates T, such as shown in Figs. 13 and 14, having nearly the same marginal form as the matrices, but differing slightly in shape at one edge from the matrices and from each other. I also cut away the ends of the spaces, as shown in Fig. 16, so that they present different forms. The shapes of the spaces and selecting-plates and their relative arrangement are such that when a matrix-line is advanced, as shown in Fig. 7, in an endwise direction between the two series of spaces to the casting-point the edge of the first selecting-plate, protruding beyond the matrices, will engage against the side of the first space and carry its end forward with the line, while the second plate will engage the second space in like manner, and so on throughout the series, as plainly shown in Figs. 8 and 15, the effect being to cause a distribution or adjustment of the ends of the spaces along the sides of the matrix-line in a position to be thrust through the line at points where spaces are to occur between the words.

Figure 8:
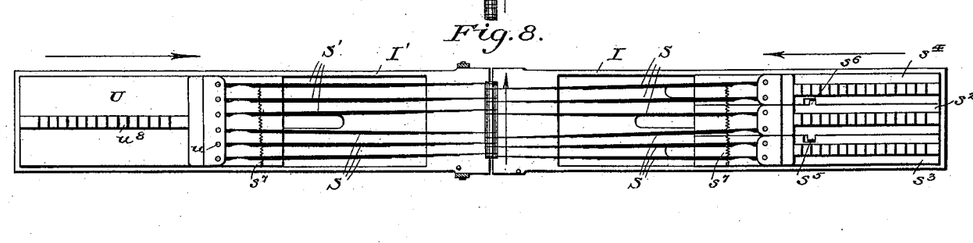
Fig. 8 is a similar plan view showing the composed line in position between the justifying bars or spaces with the latter distributed in position to enter the line at the required points.
Figure 9:
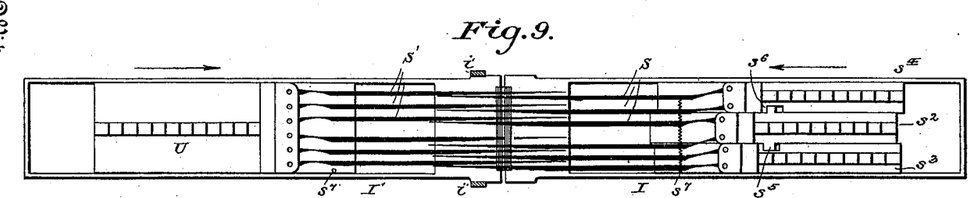
Figs. 9, 10, and 11 are top plan views showing the justifying action at different stages.
Figure 10:
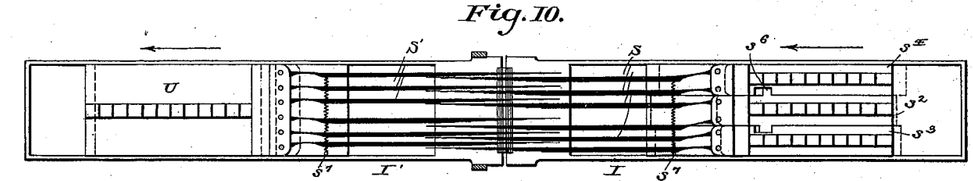
Figure 11:
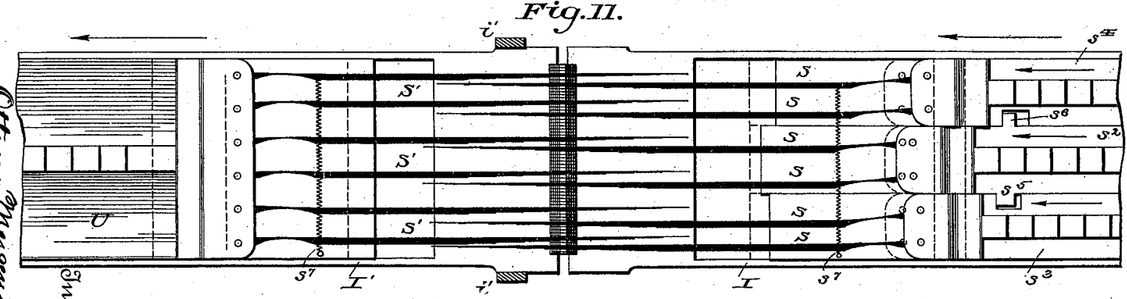

The operation of the machine is as follows: The galley D being filled with composed lines of matrices and the galley D' being emptied, the machine is set in motion. The carrier H transfers a line of matrices from the galley D into the guide G directly over the mold and between the ends of the two series of spaces, the selecting-plates in the matrix-line serving to carry the ends of the spaces forward from their positions shown in Fig. 7 until they are distributed along the sides of the matrix-line, as seen in Fig. 8. The justification then takes place. The guide G is depressed to present the matrix-line tightly over the top of the mold, while the mouth of the melting-pot closes against the under face of the mold. The pump acts and delivers molten metal into the mold, producing the linotype therein. The guide then rises, lifting the matrices clear of the mold and of the letters formed on the linotype or slug, the mouth of the mold descends, and the mold-carrier M revolves and makes one-fourth of a revolution, presenting a new and empty mold in position for the next line of matrices and presenting the linotype last cast to a position in front of the trimming-knife. The previously-formed linotype in the third mold, lying under the ejector, is delivered into the galley. The line of matrices just used is transferred to the second galley D', and the operations repeated.

The justifying action is as follows: After the spaces have had their ends distributed along the matrix-line by its advance the two series of spaces are advanced through the line from opposite sides until the jaws or abutments limiting the length of the line prevent the spaces from advancing farther. The spaces on the left are slightly retracted to withdraw their partly-entered shoulders and the spaces on the right, which may be unequally entered into the line, are advanced positively to complete the justification.

While I have shown each of the slides $s^2$ $s^3$ $s^4$ as actuating two of the spaces or space-bars, it is to be understood that this number is not necessarily fixed. Each slide may carry a single space. The essential features of the invention in this connection are the advancement of the spaces by independently-movable slides, so that part of the spaces may be advanced into the line beyond the remainder, and the connection of such slides so that one will impart motion to another. It is this elongation of the line by small increments which enables me to fill out in every instance to the exact length required and which overcomes the difficulties which would attend an attempt to advance all the spaces in unison when there is only a small space to be filled.

While I have referred herein to matrices in particular, it is to be understood that the specification and claims both are intended to include as the equivalent of matrices male dies or punches.

While I prefer to employ in a machine organized like that represented in the drawings spaces or justifying-bars which are permanently connected to the operating-slide, it is to be understood that I may employ stepped spaces, which are set into the line in the course of composition or subsequently by any suitable means. The spaces thus inserted are to be operated by slides, such as herein described, or by any equivalent operating mechanism arranged to act on the rear ends of the spaces.

I do not claim separately herein the withdrawal of a partly-entered step or shoulder of a space from the line, this feature, separately considered, being claimed in my prior application, Serial No. 481,339. Neither do I claim, broadly, herein a series of spaces divided into groups and independently operated in the manner represented in my application, Serial No. 479,370.

Having thus described my invention, what I claim is—

1. A composed line of matrices, and a series of elongated stepped spaces inserted in said line from opposite directions, in combination with mechanism for thrusting said spaces through the line until its elongation is effected, means for thereafter withdrawing the spaces on one side sufficiently to remove their partly-entered steps from the line, and means for finally advancing the spaces from the opposite side, a further distance.

2. In combination with matrices and blank plates, mechanism for composing said matrices in line and for introducing the blank plates into the line at points where spaces are to occur, a series of stepped spaces, and mechanism acting to thrust said spaces through the line adjacent to the blank plates.

3. In a justifying mechanism a series of laterally-movable space-bars, a composed line of matrices containing selecting-plates adapted to engage the respective bars, and means for advancing the matrix-line endwise, past the spaces, whereby the ends of the spaces are distributed along the line, in position to enter the same at the required points.

4. In a justifying mechanism, the combination of a line of matrices, a series of variant plates inserted in said line, a series of elongated spaces having ends of variant form, means for shifting the matrix-line past the ends of the spaces, that the latter may be distributed by the plates, and means for adjusting the spaces endwise through the line, to effect the justification.

5. In a justifying mechanism and in combination with means for presenting a line of matrices between them, two series of stepped spaces, arranged and adapted to be thrust through the matrix-line from opposite sides.

6. In a justifying mechanism and in combination with means for presenting a line of matrices between them, two series of space-bars, those of one series connected with a single slide and adapted to be advanced equally and in unison through the line and those on the opposite side divided into two or more groups, and connected with means for advancing those of one group slightly in advance of those in the next group, whereby the line may be lengthened by the action of less than the whole number of spaces at a time.

7. In a justifying mechanism and in combination with a series of stepped spaces, space-advancing slides having a limited independent motion and arranged to engage and move one another.

8. In a justifying mechanism and in combination with a series of stepped spaces, a series of slides or carriers, acting to advance the spacers endwise through the line; means for causing these slides to advance successively different distances, and means for thereafter advancing the slides in series, to predetermined points, that the entered steps of the spaces may be fully seated in the line.

9. In a justifying mechanism, a series of stepped spaces, a series of reciprocating slides to which said spaces are jointed, means for swinging the free ends of the spaces laterally and closing them together when not in action, means for distributing the ends of the spaces along the composed line, in suitable positions to enter the same, and means for thrusting said spaces endwise through the line.

10. In combination with a line of matrices, two series of stepped space-bars, slides and connections thereto for advancing said spaces with yielding pressure, through the line of matrices, the pawl-and-ratchet mechanism for slightly withdrawing one series of spaces, and a pawl-and-ratchet mechanism for further advancing the other series of spaces.

11. In a justifying mechanism and in combination with a series of slides, having a longitudinal motion only, a series of tapered spaces pivoted at their thicker ends to the slides, whereby they are adapted to swing laterally, for distribution along the composed line, as may be demanded.

In testimony whereof I hereunto set my hand, this 15th day of July, 1893, in the presence of two attesting witnesses.

OTT. MERGENTHALER.

Witnesses:
   THOS. M. DOBBIN,
   WILLIAM H. BERRY.